United States Patent
Smith et al.

(10) Patent No.: US 6,502,191 B1
(45) Date of Patent: *Dec. 31, 2002

(54) METHOD AND SYSTEM FOR BINARY DATA FIREWALL DELIVERY

(75) Inventors: Jeffrey C. Smith, Menlo Park; Jean-Christophe Bandini, Cupertino, both of CA (US)

(73) Assignee: Tumbleweed Communications Corp., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,864

(22) Filed: Feb. 14, 1997

(51) Int. Cl.[7] .................................................. G06F 11/30
(52) U.S. Cl. ...................................... 713/201; 713/200
(58) Field of Search .......................... 395/186, 187.01, 395/200.48, 200.47; 713/200, 201, 202; 709/218, 217

(56) References Cited

U.S. PATENT DOCUMENTS

| | | | |
|---|---|---|---|
| 4,532,588 A | 7/1985 | Foster ......................... | 364/200 |
| 4,713,780 A | 12/1987 | Schultz et al. ............... | 364/514 |
| 4,754,428 A | 6/1988 | Schultz et al. ............... | 364/900 |
| 4,837,798 A | 6/1989 | Cohen et al. ................. | 379/88 |
| 4,951,196 A * | 8/1990 | Jackson ........................ | 705/37 |
| 5,008,814 A | 4/1991 | Mathur ........................ | 364/200 |
| 5,054,096 A * | 10/1991 | Beizer ......................... | 382/305 |
| 5,119,465 A * | 6/1992 | Jack et al. .................... | 395/500 |
| 5,210,824 A | 5/1993 | Putz et al. .................... | 395/145 |
| 5,293,250 A | 3/1994 | Okumura et al. ............ | 358/402 |
| 5,404,231 A | 4/1995 | Bloomfiled .................. | 358/400 |
| 5,406,557 A | 4/1995 | Baudoin ....................... | 370/61 |
| 5,416,842 A * | 5/1995 | Aziz ............................ | 380/30 |
| 5,424,724 A | 6/1995 | Williams et al. ........ | 340/825.05 |
| 5,495,610 A | 2/1996 | Shing et al. ................. | 395/600 |
| 5,513,126 A | 4/1996 | Harkins et al. ........... | 364/514 A |
| 5,550,984 A | 8/1996 | Gelb ...................... | 395/200.17 |
| 5,550,994 A * | 8/1996 | Tashiro et al. | |
| 5,608,819 A * | 3/1997 | Ikeuchi ....................... | 382/156 |
| 5,608,874 A | 3/1997 | Ogawa et al. .......... | 395/200.15 |
| 5,675,507 A | 10/1997 | Bobo, II .................. | 364/514 R |
| 5,677,955 A | 10/1997 | Doggett et al. ............... | 380/24 |
| 5,706,442 A * | 1/1998 | Anderson et al. ........... | 395/227 |
| 5,708,780 A | 1/1998 | Levergood et al. ..... | 395/200.12 |
| 5,708,826 A * | 1/1998 | Ikeda et al. ................. | 707/501 |
| 5,710,883 A * | 1/1998 | Hong et al. ............ | 395/200.17 |
| 5,727,156 A | 3/1998 | Herr-Hoyman et al. ... | 395/200.49 |
| 5,751,956 A | 5/1998 | Kirsch .................... | 395/200.33 |
| 5,758,343 A | 5/1998 | Vigil et al. .................... | 707/10 |
| 5,764,906 A | 6/1998 | Edelstein et al. ....... | 395/200.49 |
| 5,778,372 A | 7/1998 | Cordell et al. .............. | 707/100 |
| 5,781,901 A | 7/1998 | Kuzma ......................... | 707/10 |
| 5,790,793 A | 8/1998 | Higley .................... | 395/200.48 |
| 5,793,972 A | 8/1998 | Shane .................... | 395/200.49 |
| 5,805,719 A * | 9/1998 | Pare, Jr. et al. ............. | 382/115 |

(List continued on next page.)

*Primary Examiner*—Dieu-Minh Le
(74) *Attorney, Agent, or Firm*—Skadden, Arps, Slate Meagher & Flom LLP

(57) ABSTRACT

A method and system sends documents from a desktop computer inside an intranet through a series of firewalls and/or proxy servers to a server residing on the Internet. A computer in an intranet system protected by a firewall or proxy server uses a software application to access the Internet. The software also encodes binary data to be sent as text. This binary data may be subdivided into smaller text packets. The text packets are sent, using HTTP, to a server outside the firewall, which has been configured to accept such text packets. The server converts the text packets back to the original binary data representation. The binary data, once resident on the internet server, can then be forwarded directly to other internet servers, internet desktop computers, printers, or fax machines.

36 Claims, 3 Drawing Sheets

U.S. PATENT DOCUMENTS

| | | | |
|---|---|---|---|
| 5,812,398 A | * 9/1998 | Nielsen | 380/25 |
| 5,812,776 A | 9/1998 | Gifford | 395/200.47 |
| 5,845,084 A | 12/1998 | Cordell et al. | 395/200.64 |
| 5,850,442 A | 12/1998 | Muftic | 380/21 |
| 5,855,020 A | 12/1998 | Kirsch | 707/10 |
| 5,860,068 A | 1/1999 | Cook | 705/26 |
| 5,892,825 A | * 4/1999 | Mages et al. | 380/3 |
| 5,903,723 A | 5/1999 | Beck et al. | 395/200.3 |
| 5,911,776 A | * 6/1999 | Guck | 709/217 |
| 5,937,164 A | * 8/1999 | Mages et al. | 380/4 |

* cited by examiner

METHOD AND SYSTEM FOR BINARY DATA FIREWALL DELIVERY

BACKGROUND OF THE INVENTION

1. Technical Field

The invention relates to communication on an electronic network. More particularly, the invention relates to a method and system for sending documents through a firewall and/or proxy server to a recipient on the Internet.

2. Description of the Prior Art

The Internet is increasingly being used for communications. It is now possible on the Internet for a sender to direct a document to a specific recipient, regardless of platform, operating system, or email system. Such communication is possible even when the recipient is not a computer but, rather, a fax machine or printer connected to the Internet.

In many instances, the sender of a document will reside on a local area network, referred to as an intranet. The sender's computer may be connected to the Internet directly, or through the intranet's server. An intranet is frequently protected and insulated from the Internet by a firewall or proxy server. A firewall is software and/or hardware which limits access to an intranet or a desktop computer. A proxy server is dedicated software and/or hardware which intercepts requests between machines running inside an intranet and machines outside the intranet.

Such firewall provides one or more of a few basic services. First, a firewall prevents intranet users from accessing specific information on the Internet. Thus, an office worker is restricted from accessing non-work-related Internet sites. Second, a firewall restricts outside access to the information available on the intranet. Third, a firewall prevents intranet users from sending confidential information from the intranet to the Internet. Typically, blocking unsolicited outside access to the intranet also blocks information transfer from intranet to Internet.

Various methods have been used to transfer data on the Internet between intranets protected by firewalls. One such method is the key management scheme described in Aziz, Method and Apparatus for Key-Management Scheme for Use With Internet Protocols at Site Firewalls, U.S. Pat. No. 5,416,842 (May 16, 1995). In this method, intersite traffic is encrypted at the Internet Protocol (IP) layer by using a Skip scheme to prevent detection of a source and destination address of a communicating node.

IP packets are encrypted only from site firewall to site firewall, such that only firewall servers need to participate in the Skip scheme. When a firewall receives from an interior site node an IP packet intended for a remote firewall, it encrypts the IP packet and sends it encapsulated in another IP packet destined for the remote firewall. The remote firewall decrypts the encapsulated packet and sends it in the clear to the destination node on the interior side of the remote firewall.

Such method, however, requires the encrypted IP packet to be received by a remote firewall server that is configured to decrypt the packet. The encrypted information cannot be directly sent to a computer or intranet system that does not use such firewall server, or to a device such as a fax machine or printer.

A security system for connecting computer networks is described in Gelb, Security System for Preventing Unauthorized Communications Between Networks by Translating Communications Received in IP Protocol to Non-IP Protocol to Remove Address and Routing Services Information, U.S. Pat. No. 5,550,984 (Aug. 27, 1996). However, Gelb does not address how documents may be sent through a firewall or proxy server.

It would therefore be an advantage to provide a method and system for sending documents through a series of firewalls and/or proxy servers. It would be a further advantage if such method and system permitted the documents to be transmitted to a device such as a fax machine or a printer. It would be yet another advantage if such method and system did not require the receiving computer of device to be served by a decrypting firewall.

SUMMARY OF THE INUENTION

The invention provides a method and system for sending documents from a desktop computer inside an intranet through a series of firewalls and/or proxy servers to a server residing on the Internet. Firewalls presume that HTTP for textual data is a valid operation that allows users to fill in HTML forms. Thus, firewalls do not block HTTP for textual data. The invention circumvents the security provided by firewalls by using this feature of HTTP to move a document through the firewall.

A computer in an intranet system protected by a firewall or proxy server uses a software application to access the Internet. The software also encodes binary data to be sent as text. This binary data may be subdivided into smaller text packets. The text packets are sent, using HTTP, to a server outside the firewall, which has been configured to accept such text packets. The server converts the text packets back to the original binary data representation. The binary data, once resident on the internet server, can then be forwarded directly to other internet servers, internet desktop computers, printers, or fax machines.

DERAILED DESCRIPTION OF THE INVENTION

The invention provides a method and system for sending documents through a series of firewalls and/or proxy servers. Firewalls and proxy servers block the distribution of virtually all types of data from a desktop computer to an internet server. However, firewalls presume that Hypertext Transfer Protocol (HTTP) for textual data is a valid operation that allows users to fill in Hypertext Markup Language (HTML) forms. Thus, firewalls do not block HTTP for textual data. The invention circumvents the security provided by firewalls by using this feature of HTTP to move a document through the firewall.

The invention delivers binary data from a desktop computer inside an intranet across a series of firewalls and/or proxy servers to a server residing on the internet. The data, once resident on the internet server, may then be forwarded directly to a receiver, such as other internet servers, internet desktop computers, printers, or fax machines. Various techniques are employed to implement firewalls and proxy servers. For example, dedicated hardware or software may be used to block various Telecommunications Protocol/ Internet Protocol (TCP/IP) ports. Software may be used to analyze the type of information being sent and block, for example, "bad" information. However, for an intranet user to access the Internet, HTTP—the most basic protocol for accessing Internet information—must be available. HTTP for textual data is presumed to be a valid operation that allows users to fill in HTML forms. Thus, the various firewall and proxy server schemes do not block HTTP.

The primary purpose of HTTP is to "pull" information across the Internet. An HTTP server is given the address of a file, known as a Uniform Resource Locator (URL) and the server returns the data referenced by that URL. However, HTTP also supports "pushing" information across the Internet. For example, many HTML pages include a form into which a user inputs data and to send to the server. Such form is used, for example, to request a search of the Internet. In this instance, HTTP pulls information from the server to the user to access the form. HTTP then pushes the data input from the form from the user to the server.

Since HTTP is seldom, if ever, blocked (particularly for small textual data), and can be used to push and pull information, HTTP can be used to circumvent most firewalls and proxy servers. A user is thereby able to send binary data from a desktop computer on an intranet to the Internet. While the preferred embodiment of the invention sends documents from an intranet to the Internet, one skilled in the art will readily appreciate that the teachings of the invention can also be applied to other electronic communications networks, such as a wide area network.

Figure 1:
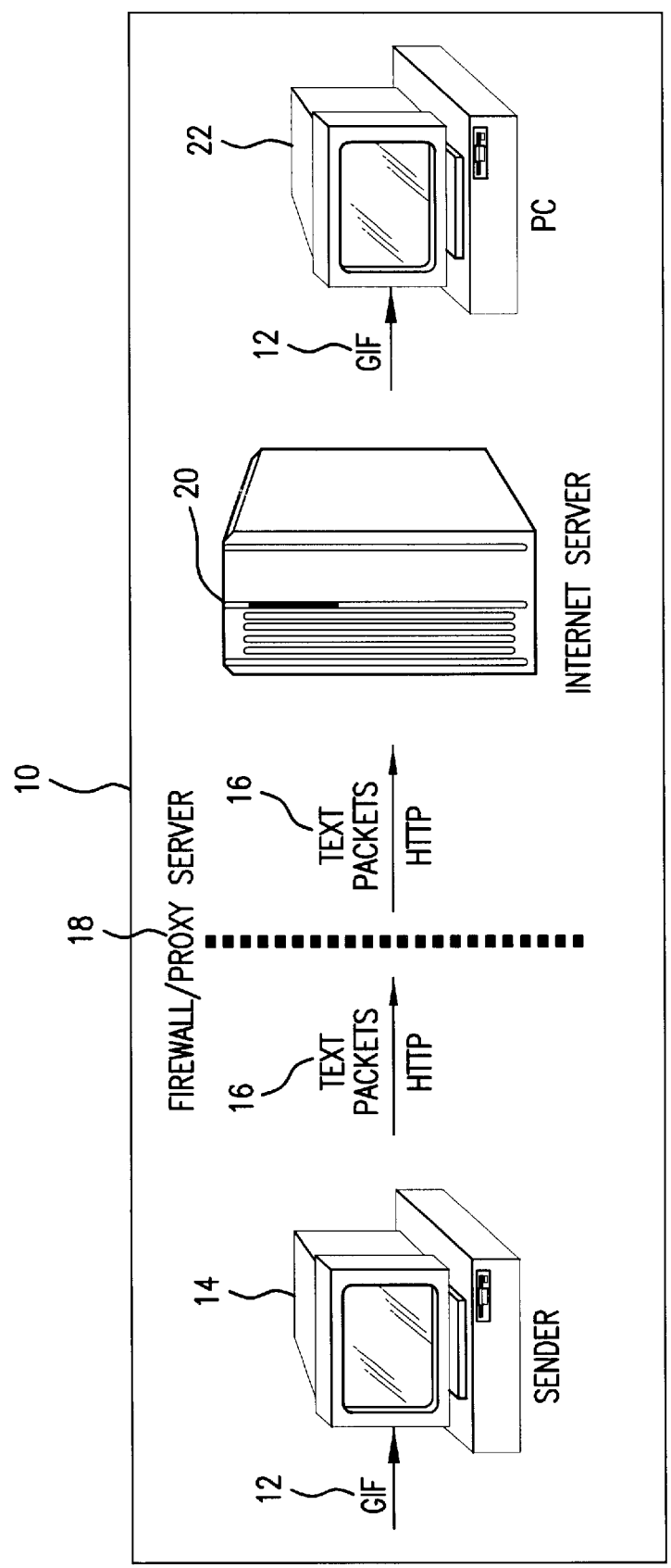
FIG. 1 is a schematic diagram of the system for transmission of data across a firewall and/or proxy server, according to the invention.

FIG. 1 is a schematic diagram of the system 10 for transmission of data across a firewall and/or proxy server, according to the invention. A document or file, such as a GIF format image file 12 is stored in a computer 14 that resides in an intranet system. The intranet is protected by one or more firewalls and/or proxy servers 18. In the preferred embodiment of the invention, the computer is a desktop computer. However, in alternate embodiments of the invention, the computer is a server computer.

Some firewalls and proxy servers block HTTP push for non-textual data. Additionally, certain firewalls and proxy servers block HTTP push based on the size of the data. For example, a typical form does not include a significant amount of information to be sent to the server. Thus, the HTTP push size may be restricted to the amount of textual data required, for example, to complete an HTML form.

In the preferred embodiment of the invention, therefore, the sending computer also encodes the binary data to be sent as text, for example using a base-64 encoding. If HTTP push is blocked based on the size of the data, the sending computer will also break the data into smaller packets to comply with the size restrictions. Thus, a binary file is converted to text and broken down by the sending computer into small "text packets" 16.

The client then sends these text packets through one or more firewalls and/or proxy servers 18. The software running on the machine of the sender which attempts to deliver the file across the firewall/proxy server will be referred to as Send Client. The text packets are received by a server 20 outside the firewall which has been configured to accept the text packets. The server reassembles the text packets and converts the text back to the native, binary representation for the GIF file 12.

The binary data or file is then sent to the intended Recipient. The invention's use of a server to reassemble the file is advantageous as the receiving device is not required to have such capabilities. Thus, the Recipient may be a desktop computer 22 connected electronically to the Internet (or another wide area network), or may in fact be a device, such as a printer, fax machine, or a personal digital assistant.

Figure 2:
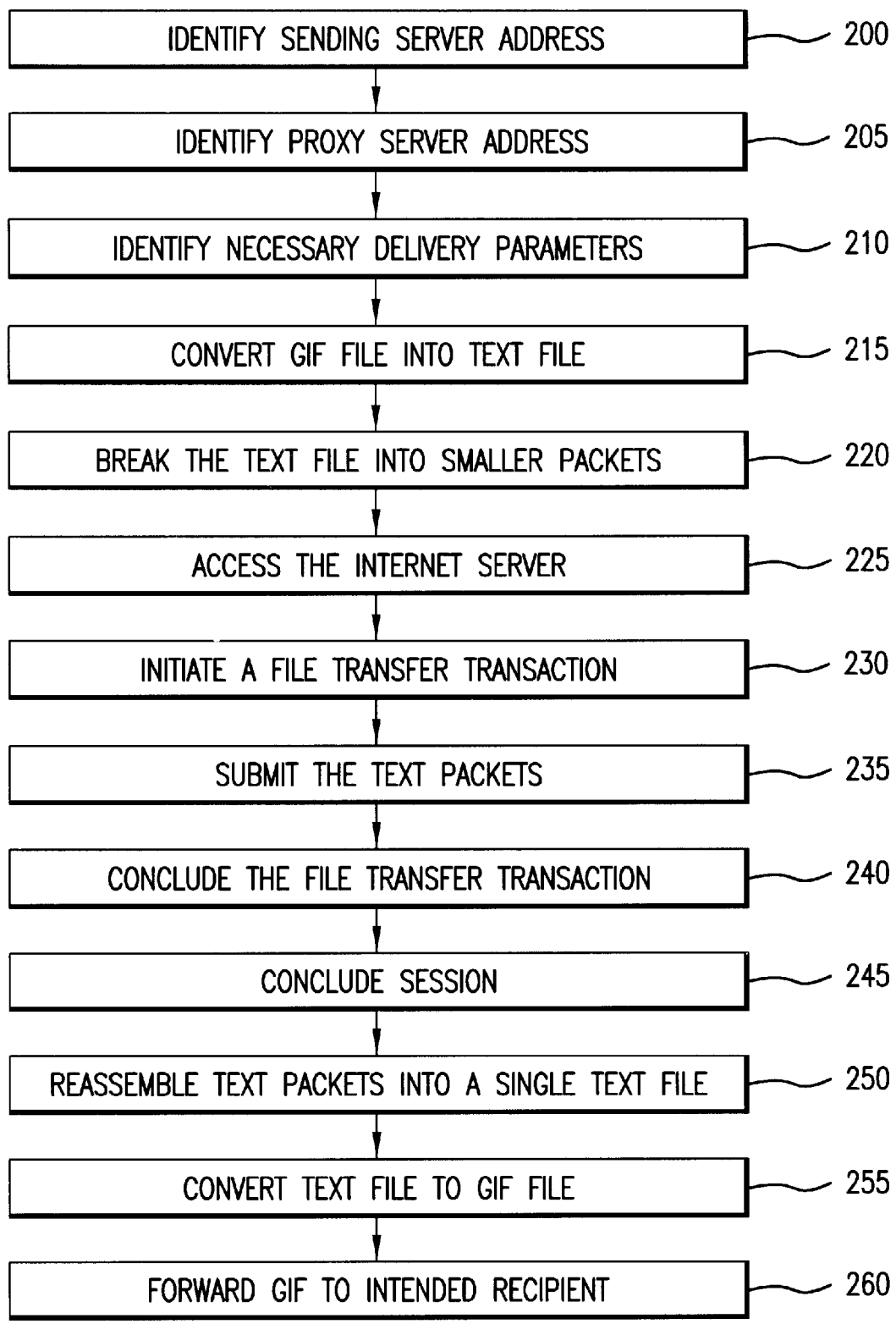
FIG. 2 an exemplary flow chart illustrating the algorithm for transmission of data across a firewall and/or proxy server, according to the invention.

FIG. 2 an exemplary flow chart illustrating the algorithm for transmission of data across a firewall and/or proxy server, according to the invention. In this example, a GIF file in its native binary representation is being sent from a desktop computer to another desktop computer. The sending computer resides inside an intranet which is protected by one or more proxy servers and firewalls. The receiving computer is connected to the sending computer by the Internet via a server running on the Internet.

The firewall may be, for example, a router configured to filter packets, or a dedicated firewall machine. A proxy server may be running in addition to the presence of the firewall. The sending computer forwards the GIF file to the server on the Internet through the firewall and proxy server using the following algorithm.

The sending computer first identifies the address of the Delivery Server residing on the Internet (or wide area network) which will deliver the file (200). The Delivery Server acts as a liaison, expediting the delivery between the Send Client software and an intended Recipient. In the preferred embodiment of the invention, the Delivery Server software which intercepts the text packets and constructs the native file runs on a dedicated Delivery Server. However, in an alternative, equally preferred embodiment, the Delivery Server software runs directly on the recipient's intranet system, thereby negating the need for a liaison.

Next, the sending computer identifies the address, if it exists, of the proxy server which will intercept all requests to send or retrieve information to or from the Internet server (205). The sending computer must also identify any necessary delivery parameters (210). The sending computer must provide this information to enable HTTP access.

The Send Client software will often require predefined configuration settings to specify the type of transaction to initiate and to identify the necessary parameters specific to that transaction to communicate to the Delivery Server. For example, the parameters for a file transfer transaction include the name of the file, the size of the file, and the type of file. Other delivery parameters include the IP of the Delivery Server, the IP of the proxy server if one exists, any account information specific to the proxy server, such as an account name and password, and any account information required to create a session (or log in) to the Delivery Server.

The sending computer next converts the file, for example a GIF file, into an text file (215). In the preferred embodiment of the invention, the sending computer uses a base 64 ASCII (text) encoding to generate the non-binary representation of the file. However, any other appropriate encoding method may also be used.

For those firewalls or proxy servers that block not only the type of data or packet, but also the size, the ASCII text representation of the data must be subdivided into an ordered list of smaller text packets (220). For example, a file of 20 K in binary form, may grow to 30 K once converted to ASCII. Using a fixed packet size of 4 K would yield eight packets to transfer from the Send Client to the Delivery Server, the last packet requiring only 2 K.

The sending computer accesses the Internet server either directly, or via the proxy server, if one exists, using HTTP (225). A session between the client and the server is thereby initiated. Referencing the established session, the sending computer then initiates a file transfer transaction with the Delivery Server (230).

The Delivery Server and the Send Client software residing on the sending computer are connected via a bidirectional communication link or pipe called the HTTP Conduit. HTTP is primarily a unidirectional protocol, enabling a user to retrieve a file from a server by presenting the server with a URL. The server responds by transmitting the file back to the user. HTTP, however, also enables the user to send information to the server itself, for example, to fill out forms, and hence is bidirectional. This capability is referred to as the HTTP POST method. The HTTP POST method permits the HTTP protocol to become bidirectional, allowing information to flow both to and from the Send Client and the server.

Delivery Protocol is the protocol which is built on top of the HTTP Conduit to enable and facilitate binary data delivery from a Send Client to a Delivery Server. All Delivery Protocol communications between the Send Client and the Delivery Server occur inside an HTTP POST. The HTTP POST is the conduit that allows the Delivery Protocol to send information to the Delivery Server. Each time the Send Client interacts with the Delivery Server, it initiates an HTTP POST operation by asking for a local URL on the Delivery Server, and then sending data back to the Delivery Server via the POST operation.

The bidirectional conduit between the Send Client and the Delivery Server uses the following HTTP interaction:

(1) the Send Client ask Delivery Server for local URL via HTTP;

(2) the Delivery Server returns an acknowledgment message to the Send Client; and (3) the Send Client uses HTTP POST to forward data to the Delivery Server. This data is the protocol used to interact between the Send Client and the Delivery Server, which in turn may periodically include any binary data which the Send Client desires to transfer to the Delivery Server.

In instances where a proxy server exists, the communication between the Send Client and the Delivery Server may be indirect and would in such cases go through the proxy server.

It should be appreciated that any such mechanism on top of HTTP may be used to implement this invention. Further, any protocol, in addition to HTTP, which is not blocked by this firewall/proxy server, and which suppports unidirectional communication, could be used to implement this invention.

Using the HTTP Conduit as an interface between the Send Client and the Delivery Server, the Delivery Protocol specifies the following:

(1) Sessions: Sessions identify a unique binding and series of transactions between the Send Client and the Delivery Server. A session is established to commence data transfer from the Send Client to the Delivery Server. To establish the session, the Send Client presents account and other identifying information to the Delivery Server. If the information is valid, the Delivery Server forwards a session ID to the Send Client. This session ID is used to authenticate and identify the session in all subsequent communication between the Send Client and the Delivery Server.

(2) Transactions: Once a session has been established, the Send Client can initiate one or more transactions with the Delivery Server, such as the transfer of the all the binary data constituting a given file.

(3) File Transfer Transaction: The Send Client specifies the type of transaction to initiate, as well as parameters specific to that transaction. For a file transfer transaction, the parameters include the name of the file, the size of the file, and the type of file. If the specified parameters are valid, the Delivery Server returns a transaction ID. From this point on, the Send Client forwards each text packet to the Delivery Server, referencing both session and transaction IDs. The Send Client also includes a reference to the size of the each text packet. The Delivery Server returns a success code for each packet of delivered data. At the conclusion of a successful data transfer, the Send Client forwards a message to the Delivery Server, and the transaction is terminated. If no other transactions are pending, the Send Client may also terminate the session.

Using the initiated file transfer transaction and the Delivery Protocol, the sending computer submits the text packets to the Delivery Server via the HPPT Conduit over subsequent HTTP requests (235). The file transfer transaction with the server is concluded (240), and the session with the Delivery Server is then concluded (245).

At the conclusion of the delivery transaction and session, the Delivery Server reassembles the text packets into a single text file (250). The Delivery Server converts the text file to the native GIF file (255) and forwards the native GIF to the intended Recipient (260). The native GIF may be forwarded either directly or by reference; that is (for example), an e-mail attachment (direct) or a VRL that is forwarded to the document on a server (reference). Transmission to a facsimile machine or printer is also considered a direct forward (although they are not e-mail attachments).

Figure 3:
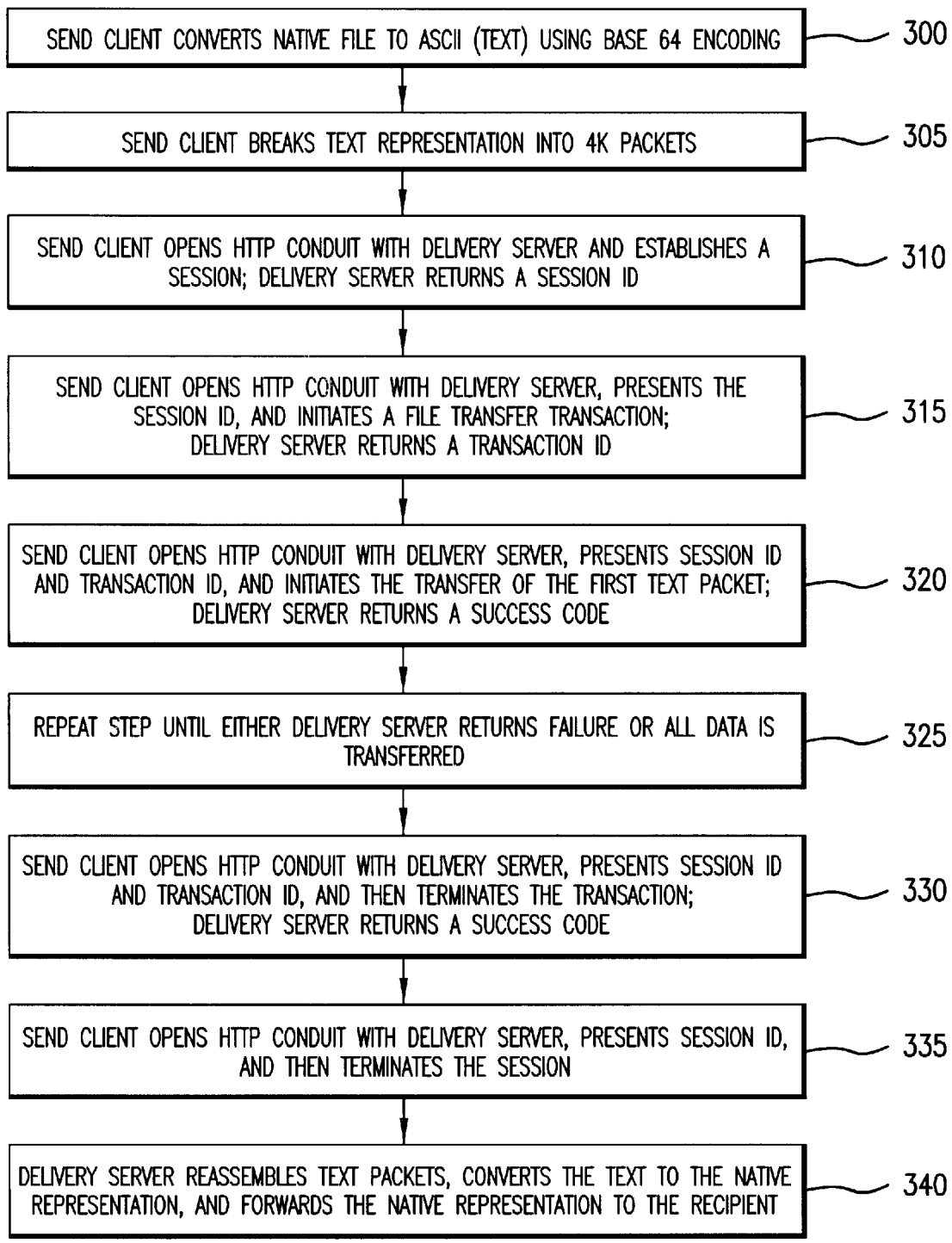
FIG. 3 is an exemplary flow chart of the set of operations necessary to transfer a native file across a firewall and/or proxy server, according to the invention.

FIG. 3 is an exemplary flow chart of the set of operations necessary to transfer a native file across a firewall and/or proxy server. The Send Client takes the native file and converts it to ASCII (text) using base 64 encoding (300). The Send Client then breaks this text representation into a series of 4 K packets (305). The Send Client opens the HTTP conduit with the Delivery Server and establishes a session (310). The Delivery Server responds by returning a session ID.

The Send Client opens the HTTP conduit with the Delivery Server and presents the session ID to initiate a file transfer transaction (315). The Delivery Server responds by returning a transaction ID. The Send Client then opens the HTTP Conduit with the Delivery Server, presents the session and transaction IDs, and initiates the transfer of the first text packet (320). Upon receiving the first text package, the Delivery Server returns a success code to the Send Client. This step is repeated until either the Delivery Server returns a failure or all data (all text packets) are successfully transmitted (325).

The Send Client opens the HTTP Conduit with the Delivery Server, presents the session and transaction IDs, and then terminates the transaction (330). If the transaction is successfully terminated, the Delivery Server returns a success code. The Send Client then opens the HTTP Conduit with the Delivery Server, presents the session ID, and terminates the session (335). The Delivery Server reassembles the text packets, converts the text to the native representation, and then forwards the native representation to the Recipient (340).

Although the invention is described herein with reference to the preferred embodiment, one skilled in the art will readily appreciate that other applications may be substituted for those set forth herein without departing from the scope of the present invention.

The source code for the Send Client and for the Delivery Server software can be readily configured by one skilled in the art using well-known programming techniques and hardware components. Additionally, Send Client and Delivery Server functions may also be accomplished by other means, including integrated circuits and programmable memory devices such as an EEPROM.

The implementation of the binary data firewall delivery solution discussed above with regard to the preferred embodiment of the invention is only one possible implementation. Alternate embodiments may use other implementations consistent with the teachings of the invention.

Accordingly, the invention should only be limited by the Claims included below.

What is claimed is:

1. A method for transferring data from a sender to a server through at least one network security mechanism, the method comprising:
   receiving the data through a selected protocol after the data has been converted from a native representation to a textual representation;
   converting the data from the textual representation to the native representation; and
   making the data available to one or more requesting clients in the native representation through the selected protocol.

2. The method of claim 1 wherein the selected protocol is a HyperText Transfer Protocol.

3. The method of claim 1 wherein the textual representation is a Base 64 textual representation.

4. The method of claim 1 wherein receiving comprises:
   receiving two or more text packets in the textual representation as separate transactions according to the protocol.

5. The method of claim 1 wherein the network security mechanism is a firewall.

6. The method of claim 1 wherein the network security mechanism is a proxy server.

7. A method for transferring data from a sender to a server through at least one network security mechanism, the method comprising:
   converting the data from a native representation to a textual representation; and
   sending the data through a selected protocol to a server in such a manner that the data is available to requesting clients from the server in the native representation through the selected protocol.

8. The method of claim 7 wherein the selected protocol is a HyperText Transfer Protocol.

9. The method of claim 7 wherein the textual representation is a Base 64 textual representation.

10. The method of claim 7 wherein sending comprises:
    sending two or more text packets in the textual representation as separate transactions according to the selected protocol.

11. The method of claim 7 wherein the network security mechanism is a firewall.

12. The method of claim 7 wherein the network security mechanism is a proxy server.

13. A computer readable medium useful in association with a computer which includes a processor and a memory, the computer readable medium including computer instructions which are configured to cause the computer to transfer data from a sender to a server through at least one network security mechanism by:
    receiving the data through a selected protocol after the data has been converted from a native representation to a textual representation;
    converting the data from the textual representation to the native representation; and
    making the data available to one or more requesting clients in the native representation through the selected protocol.

14. The computer readable medium of claim 13 wherein the selected protocol is a HyperText Transfer Protocol.

15. The computer readable medium of claim 13 wherein the textual representation is a Base 64 textual representation.

16. The computer readable medium of claim 13 wherein receiving comprises:
    receiving two or more text packets in the textual representation as separate transactions according to the protocol.

17. The computer readable medium of claim 13 wherein the network security mechanism is a firewall.

18. The computer readable medium of claim 13 wherein the network security mechanism is a proxy server.

19. A computer readable medium useful in association with a computer which includes a processor and a memory, the computer readable medium including computer instructions which are configured to cause the computer to transfer data from a sender to a server through at least one network security mechanism by:
    converting the data from a native representation to a textual representation; and
    sending the data through a selected protocol to a server in such a manner that the data is available to requesting clients from the server in the native representation through the selected protocol.

20. The computer readable medium of claim 19 wherein the selected protocol is a HyperText Transfer Protocol.

21. The computer readable medium of claim 19 wherein the textual representation is a Base 64 textual representation.

22. The computer readable medium of claim 19 wherein sending comprises:
    sending two or more text packets in the textual representation as separate transactions according to the selected protocol.

23. The computer readable medium of claim 19 wherein the network security mechanism is a firewall.

24. The computer readable medium of claim 19 wherein the network security mechanism is a proxy server.

25. A computer system comprising:
    a processor;
    a memory operatively coupled to the processor; and
    a data transfer module (i) which executes in the processor from the memory and (ii) which, when executed by the processor, causes the computer to transfer data from a sender to a server through at least one network security mechanism by:
        receiving the data through a selected protocol after the data has been converted from a native representation to a textual representation;
        converting the data from the textual representation to the native representation; and
        making the data available to one or more requesting clients in the native representation through the selected protocol.

26. The computer system of claim 25 wherein the selected protocol is a HyperText Transfer Protocol.

27. The computer system of claim 25 wherein the textual representation is a Base 64 textual representation.

28. The computer system of claim 25 wherein receiving comprises:
    receiving two or more text packets in the textual representation as separate transactions according to the protocol.

29. The computer system of claim 25 wherein the network security mechanism is a firewall.

30. The computer system of claim 25 wherein the network security mechanism is a proxy server.

31. A computer system comprising:

a processor;

a memory operatively coupled to the processor; and a data acquisition module (i) which executes in the processor from the memory and (ii) which, when executed by the processor, causes the computer to transfer data from a sender to a server through at least one network security mechanism by:

converting the data from a native representation to a textual representation; and sending the data through a selected protocol to a server in such a manner that the data is available to requesting clients from the server in the native representation through the selected protocol.

32. The computer system of claim 31 wherein the selected protocol is a HyperText Transfer Protocol.

33. The computer system of claim 31 wherein the textual representation is a Base 64 textual representation.

34. The computer system of claim 31 wherein sending comprises:

sending two or more text packets in the textual representation as separate transactions according to the selected protocol.

35. The computer system of claim 31 wherein the network security mechanism is a firewall.

36. The computer system of claim 31 wherein the network security mechanism is a proxy server.

* * * * *